(12) United States Patent
Bergström et al.

(10) Patent No.: US 12,689,879 B2
(45) Date of Patent: Jul. 21, 2026

---

(54) PUBLIC WARNING SYSTEM (PWS) RECEPTION BY AERIAL USER EQUIPMENT (UE)

(71) Applicant: Telefonaktiebolaget LM Ericsson (publ), Stockholm (SE)

(72) Inventors: Mattias Bergström, Sollentuna (SE); Helka-Liina Määttänen, Espoo (FI); Hieu Do, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 18/569,423

(22) PCT Filed: Jun. 9, 2022

(86) PCT No.: PCT/SE2022/050562
§ 371 (c)(1),
(2) Date: Dec. 12, 2023

(87) PCT Pub. No.: WO2023/277758
PCT Pub. Date: Jan. 5, 2023

(65) Prior Publication Data
US 2024/0129704 A1 Apr. 18, 2024

Related U.S. Application Data

(60) Provisional application No. 63/217,698, filed on Jul. 1, 2021.

(51) Int. Cl.
*H04W 4/90* (2018.01)
*H04W 4/021* (2018.01)

(52) U.S. Cl.
CPC ............. *H04W 4/90* (2018.02); *H04W 4/021* (2013.01)

(58) Field of Classification Search
CPC ................................. H04W 4/90; H04W 4/021
(Continued)

(56) References Cited

U.S. PATENT DOCUMENTS

| | | | |
|---|---|---|---|
| 10,687,192 B2 * | 6/2020 | Raje ......................... | H04W 4/02 |
| 2019/0166516 A1 * | 5/2019 | Kim ...................... | H04W 24/10 |

(Continued)

FOREIGN PATENT DOCUMENTS

| | | |
|---|---|---|
| WO | 2020013749 A1 | 1/2020 |
| WO | 2021045064 A1 | 3/2021 |
| WO | 2021209843 A1 | 10/2021 |

OTHER PUBLICATIONS

"3GPP TS 36.300 V16.1.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Mar. 2020, pp. 1-386.

(Continued)

*Primary Examiner* — Maria El-Zoobi
(74) *Attorney, Agent, or Firm* — Murphy, Bilak & Homiller, PLLC

(57) ABSTRACT

Embodiments include methods for a user equipment (UE) configured to receive public warning system (PWS) messages from a radio access network (RAN) comprising a plurality of cells. Such methods include receiving, via a first cell having a first ground coverage and a first aerial coverage, a PWS message having a relevant area within a second ground coverage of a second cell but not within the first ground coverage. Such methods include determining whether the PWS message is applicable to the UE based on a first indication of the relevant area, a second indication of relevant altitudes for the PWS message, a third indication of applicability of the PWS message to aerial UEs, and/or a type of signaling by which the PWS message is received.

(Continued)

Other embodiments include complementary methods for RAN nodes and core network (CN) nodes, as well as UEs and network nodes configured to perform such methods.

17 Claims, 9 Drawing Sheets

(58) Field of Classification Search
USPC ...................................................... 455/404.1
See application file for complete search history.

(56) References Cited

U.S. PATENT DOCUMENTS

| | | | |
|---|---|---|---|
| 2019/0246260 | A1 | 8/2019 | Edge et al. |
| 2019/0268879 | A1* | 8/2019 | Lee ........................ H04W 72/02 |
| 2019/0380019 | A1* | 12/2019 | Buckley .................. H04W 4/20 |
| 2020/0314624 | A1 | 10/2020 | Raje et al. |
| 2021/0160679 | A1* | 5/2021 | Henkle ................. H04W 76/50 |
| 2022/0078883 | A1* | 3/2022 | Schmidt .................. H04W 4/50 |
| 2022/0159593 | A1* | 5/2022 | Jeon .................... H04W 56/001 |
| 2022/0244745 | A1* | 8/2022 | Bisht ........................ G08G 5/34 |
| 2024/0129704 | A1* | 4/2024 | Bergström ............ H04W 4/021 |

OTHER PUBLICATIONS

"3GPP TS 38.331 V16.4.0", 3rd Generation Partnership Project; Technical Specification Group Radio Access Network; NR; Radio Resource Control (RRC) protocol specification (Release 16), Mar. 2021, pp. 1-949.

* cited by examiner

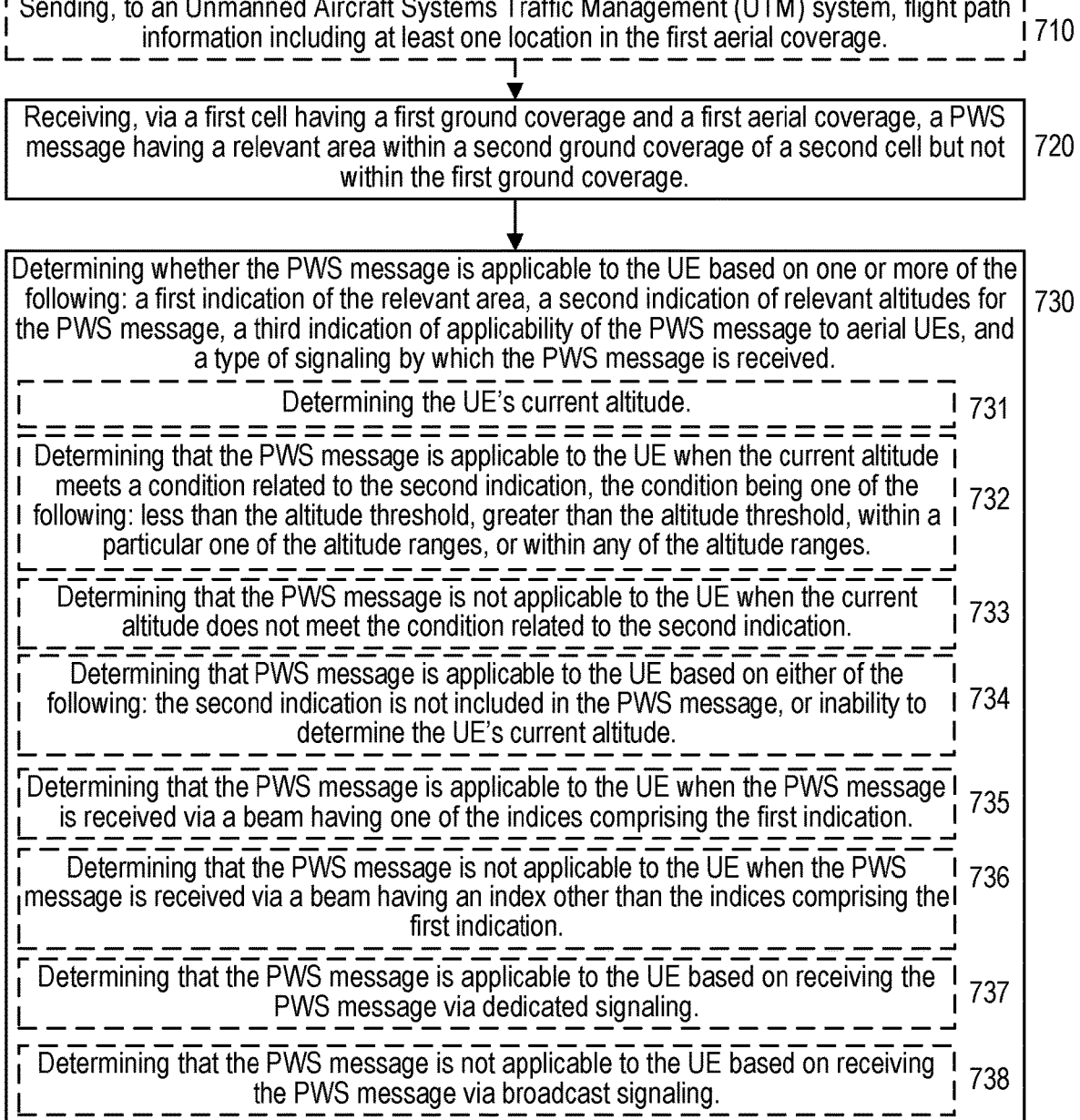

Sending, to an Unmanned Aircraft Systems Traffic Management (UTM) system, flight path information including at least one location in the first aerial coverage.   710

Receiving, via a first cell having a first ground coverage and a first aerial coverage, a PWS message having a relevant area within a second ground coverage of a second cell but not within the first ground coverage.   720

Determining whether the PWS message is applicable to the UE based on one or more of the following: a first indication of the relevant area, a second indication of relevant altitudes for the PWS message, a third indication of applicability of the PWS message to aerial UEs, and a type of signaling by which the PWS message is received.   730

Determining the UE's current altitude.   731

Determining that the PWS message is applicable to the UE when the current altitude meets a condition related to the second indication, the condition being one of the following: less than the altitude threshold, greater than the altitude threshold, within a particular one of the altitude ranges, or within any of the altitude ranges.   732

Determining that the PWS message is not applicable to the UE when the current altitude does not meet the condition related to the second indication.   733

Determining that PWS message is applicable to the UE based on either of the following: the second indication is not included in the PWS message, or inability to determine the UE's current altitude.   734

Determining that the PWS message is applicable to the UE when the PWS message is received via a beam having one of the indices comprising the first indication.   735

Determining that the PWS message is not applicable to the UE when the PWS message is received via a beam having an index other than the indices comprising the first indication.   736

Determining that the PWS message is applicable to the UE based on receiving the PWS message via dedicated signaling.   737

Determining that the PWS message is not applicable to the UE based on receiving the PWS message via broadcast signaling.   738

FIG. 7

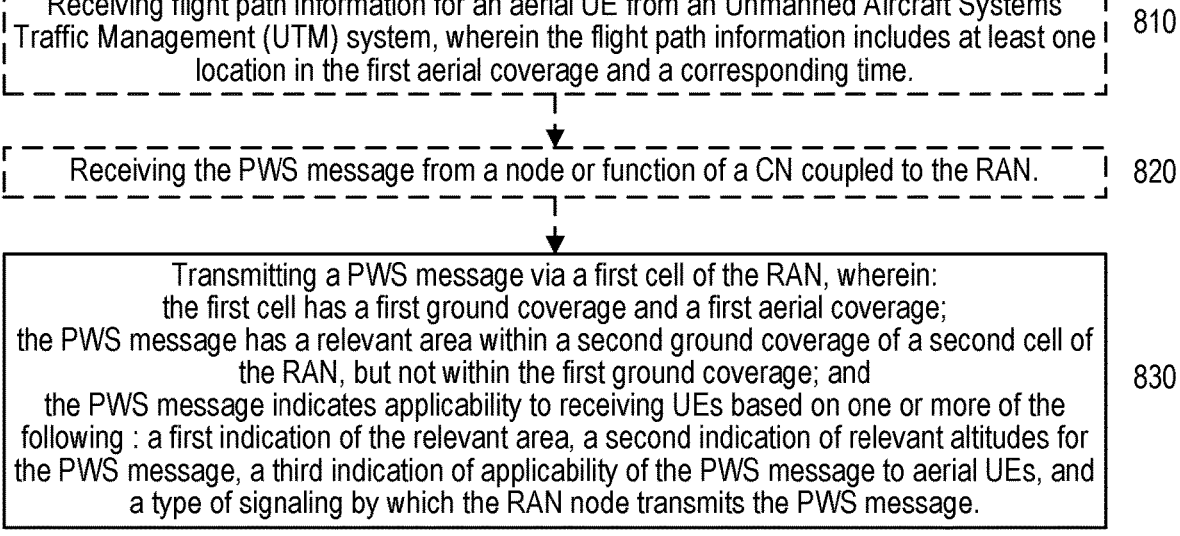

```
┌─────────────────────────────────────────────────────────────────────┐
│  Receiving flight path information for an aerial UE from an Unmanned    │   810
│  Aircraft Systems Traffic Management (UTM) system, wherein the flight   │
│  path information includes at least one location in the first aerial    │
│  coverage and a corresponding time.                                     │
└─────────────────────────────────────────────────────────────────────┘
                                   ↓
┌─────────────────────────────────────────────────────────────────────┐
│  Receiving the PWS message from a node or function of a CN coupled      │   820
│  to the RAN.                                                            │
└─────────────────────────────────────────────────────────────────────┘
                                   ↓
┌─────────────────────────────────────────────────────────────────────┐
│  Transmitting a PWS message via a first cell of the RAN, wherein:       │
│  the first cell has a first ground coverage and a first aerial          │
│  coverage;                                                              │
│  the PWS message has a relevant area within a second ground             │   830
│  coverage of a second cell of the RAN, but not within the first ground  │
│  coverage; and                                                          │
│  the PWS message indicates applicability to receiving UEs based on      │
│  one or more of the following : a first indication of the relevant      │
│  area, a second indication of relevant altitudes for the PWS message,   │
│  a third indication of applicability of the PWS message to aerial UEs,  │
│  and a type of signaling by which the RAN node transmits the PWS        │
│  message.                                                               │
└─────────────────────────────────────────────────────────────────────┘
```

FIG. 8

```
┌─────────────────────────────────────────────────────────────────────┐
│  Determining a relevant area for an incident, the relevant area being   │   910
│  within a second ground coverage of a second cell in the RAN.           │
└─────────────────────────────────────────────────────────────────────┘
                                   ↓
┌─────────────────────────────────────────────────────────────────────┐
│  Determining one or more additional cells in the RAN having respective  │
│  ground coverage areas proximate to the relevant area, wherein the      │   920
│  additional cells include a first cell having a first ground coverage   │
│  area and a first aerial coverage area.                                 │
└─────────────────────────────────────────────────────────────────────┘
                                   ↓
┌─────────────────────────────────────────────────────────────────────┐
│  Sending a PWS message, pertaining to the incident, to one or more      │   930
│  RAN nodes for transmission to UEs via the second cell and the one or   │
│  more additional cells.                                                 │
└─────────────────────────────────────────────────────────────────────┘
```

FIG. 9

PUBLIC WARNING SYSTEM (PWS) RECEPTION BY AERIAL USER EQUIPMENT (UE)

TECHNICAL FIELD

The present disclosure relates generally to wireless networks and more specifically to techniques for aerial user equipment (UE) to receive important public warnings broadcast by wireless networks.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

Currently the fifth generation ("5G") of cellular systems, also referred to as New Radio (NR), is being standardized within 3GPP. NR is developed for maximum flexibility to support multiple and substantially different use cases but shares many similarities with fourth-generation LTE. For example, NR uses CP-OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms sub-frames. A subframe is further divided into multiple slots of equal duration, with each slot including multiple OFDM-based symbols.

Both LTE and NR networks can include a 3GPP-specified Public Warning System (PWS). PWS includes specific features of Earthquake and Tsunami Warning System (ETWS) and Commercial Mobile Alert System (CMAS). For both ETWS and CMAS, the operator can broadcast messages in each cell's system information (SI, e.g., SI blocks 6-8 in NR). These messages are human readable messages, e.g., "There is a fire in the car factory, please go indoors." If a UE detects a PWS message in broadcast SI, it will forward the message to UE higher layers that can display it to the user.

Airborne radio-controlled drones (i.e., unmanned aerial vehicles or UAVs for short) are becoming more and more common. Conventionally, drones have been limited to operate within the propagation range of radio signals from dedicated or associated controllers used by drone operators. However, recently functionality allowing drones to be remotely controlled over the cellular network has increased their range considerably. However, a recent trend is to extend drone operational range by attaching an LTE UE and coupling the UE to the drone's navigation system, thereby creating an "airborne UE" or "aerial UE". With this arrangement, the drone can be controlled over a much wider range covering multiple cells, limited primarily by the drone's battery capacity. In the following, the terms "aerial UE" and "drone" are used interchangeably unless otherwise noted.

SUMMARY

LTE and NR networks are conventionally deployed to serve UEs on the ground. For example, antennas of the RAN nodes are usually tilted towards the ground such the main lobe of the antenna's coverage pattern is pointing towards the ground. However, aerial UEs often fly far above ground—even far above the network's antennas—such that aerial UEs are likely to be served by so-called "side lobes" or "back lobes" of the antenna coverage pattern, which often point upward toward the aerial UEs. This can cause various problems, issues, and/or difficulties with operation of PWS for aerial UEs.

Embodiments of the present disclosure provide specific improvements to aerial UE operation in wireless networks, such as by facilitating solutions to overcome exemplary problems summarized above and described in more detail below.

Embodiments of the present disclosure include methods (e.g., procedures) for a UE configured to receive public warning system (PWS) messages from a radio access network (RAN) comprising a plurality of cells. These exemplary methods can be performed by a UE (e.g., wireless device), such as an aerial UE.

These exemplary methods can include receiving, via a first cell having a first ground coverage and a first aerial coverage, a PWS message having a relevant area within a second ground coverage of a second cell but not within the first ground coverage. These exemplary methods can also include determining whether the PWS message is applicable to the UE based on one or more of the following: a first indication of the relevant area, a second indication of relevant altitudes for the PWS message, a third indication of applicability of the PWS message to aerial UEs, and a type of signaling by which the PWS message is received.

In some embodiments, when the UE is an aerial UE, the exemplary method can also include sending, to a UTM system, flight path information including at least one location in the first aerial coverage.

In some embodiments, the third indication indicates that the PWS message is applicable to aerial UEs based on one of the following: being included in the PWS message, or having a particular value in the PWS message. In some of these embodiments, when the third indication indicates that the PWS message is applicable to aerial UEs, determining whether the PWS message is applicable to the UE can be further based on one of the following: the UE's capability as an aerial UE, or the UE's current operation as an aerial UE.

In some embodiments, the second indication comprises an altitude threshold or one or more altitude ranges. In some of these embodiments, when the second indication is included in the PWS message, determining whether the PWS message is applicable to the UE can include the following UE operations:

determining the UE's current altitude;
  determining that the PWS message is applicable to the UE when the current altitude meets a condition related to the second indication, the condition being one of the following: less than the altitude threshold, greater than the altitude threshold, within a particular one of the altitude ranges, or within any of the altitude ranges; and
  determining that the PWS message is not applicable to the UE when the current altitude does not meet the condition related to the second indication.

In some of these embodiments, determining whether the PWS message is applicable to the UE can also include determining that PWS message is applicable to the UE based on either of the following: the second indication is not included in the PWS message, or inability to determine the UE's current altitude.

In some embodiments, the first indication comprises one or more indices of respective one or more beams (e.g., SSB beams) having coverage areas that overlap with the relevant area. In some of these embodiments, determining whether the PWS message is applicable to the UE can include the following UE operations:

determining that the PWS message is applicable to the UE when the PWS message is received via a beam having one of the indices comprising the first indication; and determining that the PWS message is not applicable to the UE when the PWS message is received via a beam having an index other than the indices comprising the first indication.

In some embodiments, determining whether the PWS message is applicable to the UE can include determining that the PWS message is applicable to the UE based on receiving the PWS message via dedicated signaling and determining that the PWS message is not applicable to the UE based on receiving the PWS message via broadcast signaling. In some of these embodiments, determining that the PWS message received via broadcast signaling is not applicable to the UE can be further based on one of the following: the UE's current operation as an aerial UE, or the UE's current altitude being above a threshold.

Other embodiments include methods (e.g., procedures) for a RAN node to provide PWS messages to UEs.

These exemplary methods can include transmitting a PWS message via a first cell of the RAN. The first cell has a first ground coverage and a first aerial coverage. The PWS message has a relevant area within a second ground coverage of a second cell of the RAN, but not within the first ground coverage. The PWS message can indicate applicability to receiving UEs based on one or more of the following: a first indication of the relevant area, a second indication of relevant altitudes for the PWS message, a third indication of applicability of the PWS message to aerial UEs, and a type of signaling by which the RAN node transmits the PWS message.

In some embodiments, these exemplary methods can also include receiving the PWS message from a node or function of a core network (CN) coupled to the RAN. The received PWS message can then be transmitted via the first cell.

In some embodiments, the third indication indicates that the PWS message is applicable to aerial UEs based on one of the following being included in the PWS message, or having a particular value in the PWS message. Additionally, the third indication further indicates whether the PWS message is applicable to each particular UE that receives the PWS message, based on one of the following: the particular UE's capability as an aerial UE, or the particular UE's current operation as an aerial UE.

In some embodiments, the second indication comprises an altitude threshold or one or more altitude ranges. Additionally, the second indication further indicates that the PWS message is applicable to each particular UE that receives the PWS message based on the particular UE's current altitude meeting a condition related to the second indication, wherein the condition is one of the following: less than the altitude threshold, greater than the altitude threshold, within a particular one of the altitude ranges, or within any of the altitude ranges. In some of these embodiments, exclusion of the second indication from the PWS message indicates that the PWS message is applicable to all UEs that receive the PWS message.

In some embodiments, when the first indication is included in the PWS message, the first indication comprises one or more indices of respective one or more beams having coverage areas that overlap with the relevant area. In such case, the first indication indicates that the PWS message is applicable to each particular UE based on the particular UE receiving the PWS message via a beam having one of the indices.

In some embodiments, the PWS message is transmitted via one of the following:

broadcast signaling, which indicates that the PWS is applicable to non-aerial UEs but not applicable to aerial UEs; or unicast signaling to a particular UE for which the PWS message is applicable.

In some of these embodiments, when the PWS message is transmitted via broadcast signaling, applicability of the PWS message to a particular receiving UE is further based on one of the following: whether or not the particular receiving UE's is currently operating as an aerial UE, or the particular receiving UE's current altitude relative to a threshold.

In some embodiments, these exemplary methods can also include receiving flight path information for an aerial UE from a UTM system. The flight path information includes at least one location in the first aerial coverage and a corresponding time. In such embodiments, the PWS message is transmitted to the aerial UE via unicast signaling at approximately the corresponding time.

Other embodiments include methods (e.g., procedures) for a CN node to provide PWS messages to UEs via a RAN. These exemplary methods can be performed by a CN node or function (e.g., MME, SGW, AMF, SMF, UPF, etc., or components thereof).

These exemplary methods can include determining a relevant area for an incident, with the relevant area being within a second ground coverage of a second cell of the RAN. These exemplary methods can also include determining one or more additional cells of the RAN having respective ground coverage areas proximate to the relevant area. The additional cells include a first cell having a first ground coverage area and a first aerial coverage area. These exemplary methods can also include sending a PWS message, pertaining to the incident, to one or more RAN nodes for transmission to UEs via the second cell and the one or more additional cells.

In some embodiments, the PWS message indicates applicability to receiving UEs based on one or more of the following: a first indication of the relevant area, a second indication of relevant altitudes for the PWS message, a third indication of applicability of the PWS message to aerial UEs, and a type of signaling by which the respective RAN nodes transmit the PWS message.

In some of these embodiments, the third indication indicates that the PWS message is applicable to aerial UEs based on one of the following: being included in the PWS message, or having a particular value in the PWS message. Additionally, the third indication indicates whether the PWS message is applicable to each particular UE that receives the PWS message, based on one of the following: the particular UE's capability as an aerial UE, or the particular UE's current operation as an aerial UE.

In some embodiments, when the second indication is included in the PWS message, the second indication comprises an altitude threshold or one or more altitude ranges. Additionally, the second indication further indicates that the PWS message is applicable to each particular UE that receives the PWS message based on the particular UE's current altitude meeting a condition related to the second indication, wherein the condition is one of the following: less than the altitude threshold, greater than the altitude threshold, within a particular one of the altitude ranges, or within any of the altitude ranges. In some of these embodiments, exclusion of the second indication from the PWS message can indicate that the PWS message is applicable to all receiving UEs.

In some embodiments, when the first indication is included in the PWS message, the first indication comprises one or more indices of respective one or more beams (e.g., SSB beams) having coverage areas that overlap with the relevant area Additionally, the first indication indicates that the PWS message is applicable to each particular UE based on the particular UE receiving the PWS message via a beam having one of the indices.

In some embodiments, the type of signaling that can be used by the RAN nodes to transmit the PWS message is one of the following:

broadcast signaling, which indicates that the PWS is applicable to non-aerial UEs but not applicable to aerial UEs; or unicast signaling to a particular UE for which the PWS message is applicable.

In some of these embodiments, when the PWS message is transmitted via broadcast signaling, applicability of the PWS message to a particular receiving UE is further based on one of the following: whether the particular UE is currently operating as an aerial UE, or the particular UE's current altitude relative to a threshold.

In some of these embodiments, determining the one or more additional cells having respective proximate ground coverage areas is based on a threshold distance from the relevant area. In such embodiments, the threshold distance is based on one or more of the following: respective operating frequencies of the second cell and the additional cells, size or spacing of the second cell and the additional cells, and maximum allowed altitude of aerial UEs.

Other embodiments include UEs (e.g., wireless devices, IoT devices, etc. or components thereof), RAN nodes (e.g., base stations, eNBs, gNBs, ng-eNBs, etc., or components thereof), and CN nodes or functions (e.g., MMEs, SGWs, AMFs, SMFs, UPFs, etc., or components thereof) configured to perform operations corresponding to any of the exemplary methods described herein. Other embodiments include non-transitory, computer-readable media storing program instructions that, when executed by processing circuitry, configure such UEs, RAN nodes, or CN nodes to perform operations corresponding to any of the exemplary methods described herein.

These and other embodiments described herein can facilitate aerial UEs to receive relevant PWS messages when they are close to an incident, even when they are served by a cell other than the cell whose ground coverage includes the relevant area for the incident. Accordingly, aerial UEs that receive these relevant PWS messages can take incident-avoidance measures that they would not under conventional techniques in which they do not receive such messages. Without such avoidance, the aerial UE's presence proximate to the incident may exacerbate the incident, hinder response to the incident, and/or result in damage to the UE. At a high level, embodiments improve the performance of PWS and facilitate safe operation of aerial UEs in a wireless network These and other objects, features, and advantages of embodiments of the present disclosure will become apparent upon reading the following Detailed Description in view of the Drawings briefly described below.

BRIEF DESCRIPTION OF THE DRAWINGS

FIG. 7 is a flow diagram of an exemplary method (e.g., procedure) for a UE (e.g., wireless device, aerial UE, IoT device, etc.), according to various embodiments of the present disclosure.

FIG. 8 is a flow diagram of an exemplary method (e.g., procedure) for a RAN node (e.g., base station, eNB, gNB, ng-eNB, en-gNB, etc. or component(s) thereof), according to various embodiments of the present disclosure.

FIG. 9 is a flow diagram of an exemplary method (e.g., procedure) for a CN node or function (e.g., MME, SGW, AMF, SMF, UPF, etc. or component(s) thereof), according to various embodiments of the present disclosure.

DETAILED DESCRIPTION

Figure 1:
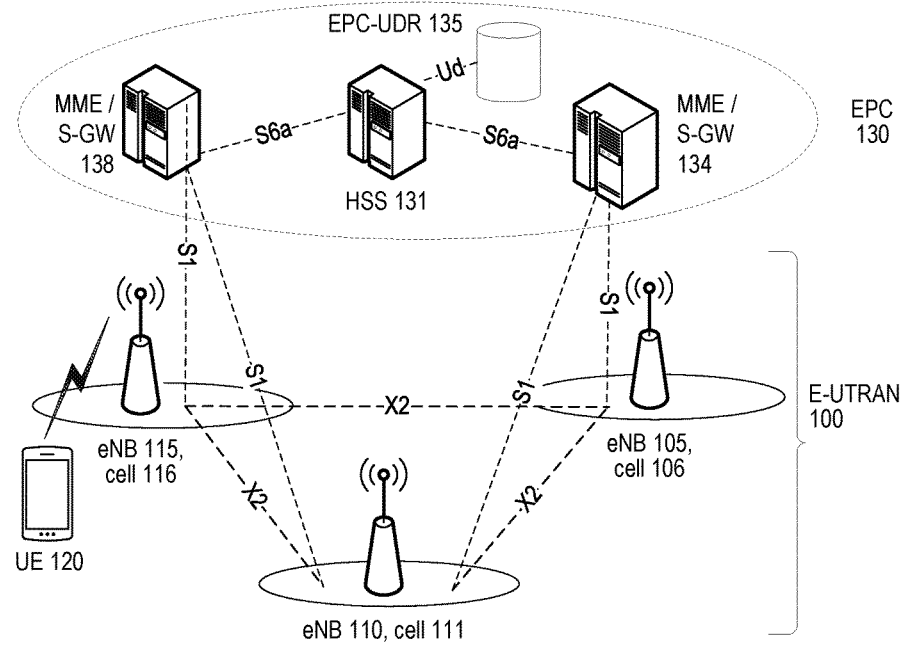
FIG. 1 shows a high-level view of an exemplary LTE network architecture.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP 5G/NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, to scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMES 134 and 138 via respective Sha interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

Figure 2:
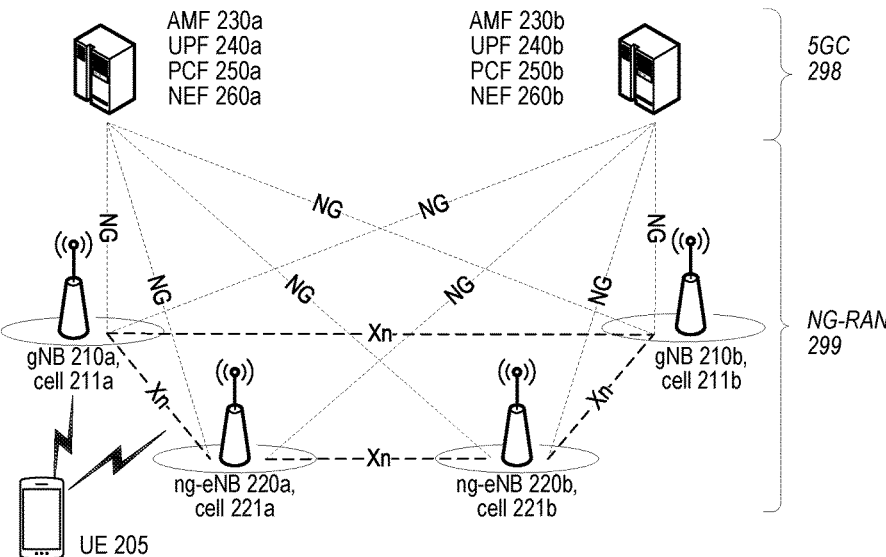
FIG. 2 shows a high-level view of an exemplary 5G/NR network architecture.

FIG. 2 shows a high-level view of an exemplary 5G network architecture that includes a Next Generation Radio Access Network (NG-RAN) 299 and a 5G Core (5GC) 298.

As shown in the figure, NG-RAN 299 can include gNBs (e.g., 210*a,b*) and ng-eNBs (e.g., 220*a,b*) that are interconnected with each other via Xn interfaces. The gNBs and ng-eNBs are also connected via the NG interfaces to 5GC 298, more specifically to the access and mobility management functions (AMFs, e.g., 230*a,b*) via respective NG-C interfaces and to the user plane functions (UPFs, e.g., 240*a,b*) via respective NG-U interfaces. Moreover, the AMFs can communicate with one or more policy control functions (PCFs, e.g., 250*a,b*) and network exposure functions (NEFs, e.g., 260*a,b*). The 5GC can also include session management functions (SNIFs, not shown).

Each of the gNBs 210 can support the NR radio interface including frequency division duplexing (FDD), time division duplexing (TDD), or a combination thereof. In contrast, each of ng-eNBs 220 can support the LTE radio interface but, unlike conventional LTE eNodeBs (eNBs), connect to the 5GC via the NG interface. Each of the gNBs and ng-eNBs can serve a geographic coverage area including one more cells, including cells 211*a-b* and 221*a-b* shown as exemplary in FIG. 2. Although gNBs and ng-eNBs are shown separately in FIG. 2, in some embodiments a single RAN node can provide both gNB and ng-eNB functionality.

The gNBs shown in FIG. 2 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry. Moreover, the terms "central unit" and "centralized unit" can be used interchangeably, as can the terms "distributed unit" and "decentralized unit."

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols. In addition to RRC IDLE and RRC CONNECTED found in LTE RRC, the NR RRC layer also includes an RRC INACTIVE state with properties similar to the "suspended" condition in LTE Rel-13.

Additionally, the gNBs and ng-eNBs can also use various directional beams to provide coverage to UEs (e.g., UE 205) in the respective cells. In general, a DL "beam" is a coverage area of a network-transmitted reference signal (RS) that may be measured or monitored by a UE. In NR, for example, such RS can include any of the following, alone or in combination: SS/PBCH block (SSB), CSI-RS, tertiary reference signals (or any other sync signal), positioning RS (PRS), demodulation RS (DMRS), phase-tracking RS (PTRS), etc. In general, SSB is available to all UEs regardless of RRC state, while other RS (e.g., CSI-RS, DMRS, PTRS) are associated with specific UEs that are in RRC CONNECTED state.

Airborne radio-controlled drones (i.e., unmanned aerial vehicles or UAVs for short) are becoming more common.

Conventionally, drones have been limited to operate within propagation range of radio signals from dedicated or associated controllers used by drone operators. However, recent functionality allowing drones to be remotely controlled over the cellular network has increased their range considerably. One recent trend is to extend drone operational range by attaching an LTE UE and coupling the UE to the drone's navigation system, thereby creating an "airborne UE" or "aerial UE". With this arrangement, the drone can be controlled over a much wider range covering multiple cells, limited primarily by the drone's battery capacity.

Recognizing the potential of connecting drones beyond visual line of sight (BVLoS) via cellular network, 3GPP has specified multiple features in LTE Rel-15, aiming at improving the efficiency and robustness of terrestrial LTE network for providing aerial connectivity services, particularly for low altitude UAVs. These features target both command-and-control traffic for flying the drone and the data (also known as payload) traffic from the drone to the cellular network. Some key features specified include:

Support for subscription-based identification
  Height reporting when UAV crosses height threshold. The report includes height, location (3D), horizontal and vertical speed.
  RSRP reporting per event of N cells' signal power above a threshold. The report includes RSRP/RSRQ/location (3D).
  UE-specific UL power control.
  Flight path information provided from UE to network. This includes network polling and list of waypoints (3D location), time stamp if available.

These features target specific requirements of serving the UAVs by LTE network, e.g., the need for flying mode detection, interference detection, and interference mitigation. Flying mode detection is related to interference detection since the interference conditions for flying aerial UEs are different from aerial UE in terrestrial mode. For interference detection, an enhancement to existing events triggering of RSRP/RSRQ/RS-SINR reports was introduced in LTE Rel-15. The UE may be configured to trigger an event such as A3, A4, A5, which all consider neighbor cell measurements. In such event triggers, a measurement report is triggered when multiple cells' measured RSRPs, RSRQs, and/or SINRs are above a threshold.

In addition to interference detection, another input to flying mode detection is event-triggered height and location reporting. A new configurable RRM height threshold event was introduced for Rel-15 aerial UEs. When the UE is configured with this event, a report is triggered when UE's altitude crosses the threshold altitude. In addition to flying mode detection, the exact height information is considered useful for network decisions about reconfiguring measurement reporting for an aerial UE when it crosses a height threshold.

LTE and NR networks such as shown in FIGS. 1-2 are conventionally deployed to serve UEs on the ground. For example, antennas of the RAN nodes (e.g., eNBs, gNBs, ng-eNBs) are usually tilted towards the ground such the main lobe of the antenna's coverage pattern is pointing towards the ground. However, aerial UEs often fly far above ground—even far above the network's antennas—such that aerial UEs are likely to be served by the so-called "side lobes" or "back lobes" of the antenna coverage pattern, which are pointing upward toward the aerial UEs.

Typically, side lobes and back lobes are narrower cover narrower areas compared to a main lobe. As such, while cells of an LTE or NR network may look like large patches on the ground, the aerial coverage of each cell is spottier and/or disjoint. In other words, a particular cell may cover many disjoint coverage areas in the sky. Further, due to the line-of-sight (LoS) or near-LoS propagation condition from a base station to a UAV at high altitude, a particular LTE- or NR-cell may serve areas in the sky far away from the serving base station and/or a ground coverage area for the cell.

Figure 3:
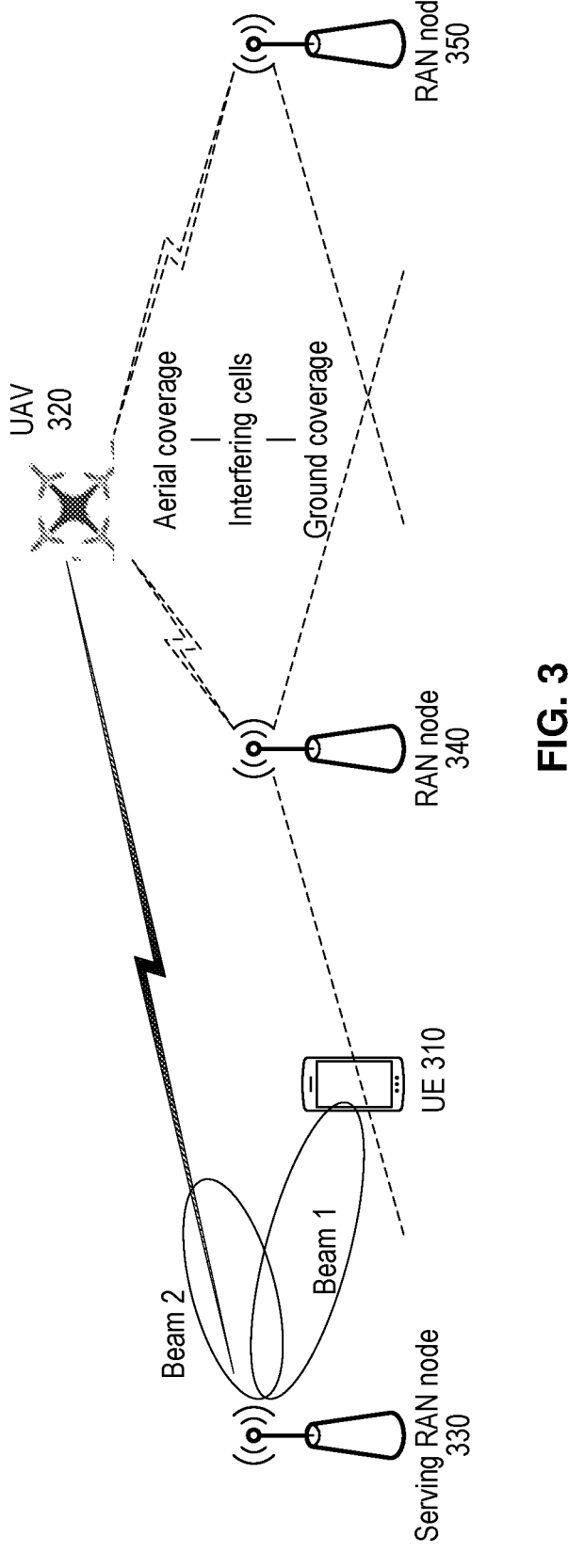
FIGS. 3-4 illustrates differences between aerial coverage and ground coverage for various cells.

FIG. 3 illustrates different aerial and ground coverages for a particular cell. In this illustration, the left-most RAN node is serving a proximate UE on the ground by a first beam and a distant aerial UE (labelled "UAV") by a second beam. The aerial UE is more proximate to the ground coverage of cells provided by two other RAN nodes; these cells create interference for the aerial UE.

Figure 4:
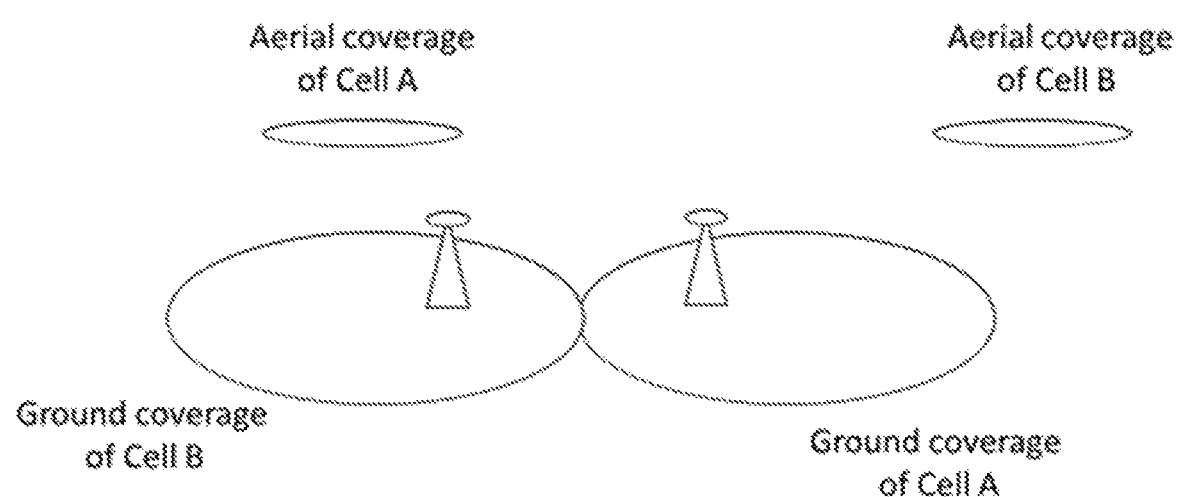

To summarize, a cell A that coverage an area on the ground may not serve an aerial UE that is vertically above that area. Rather, another cell B may have aerial coverage above cell A. Similarly, cell A may have aerial coverage above the ground area covered by cell B. This is illustrated in FIG. 4.

An aerial UE may be configured to fly according to a certain path that may be reported by the aerial UE to the network, as mentioned above. Alternatively, the flight path may be configured in the aerial UE by the network. Furthermore, an aerial UE could register its planned flight path with an authorized entity such as Unmanned Aircraft Systems (UAS) Traffic Management (UTM), which is a collaborative, automated, and federated airspace management approach that enables safe, efficient, and equitable small UAS operations at scale. Alternately, the flight path for the UE can be determined by the UTM. By means of UTM and LTE/NR networks, aerial UEs can exchange or share flight path information with other aerial UEs.

As briefly mentioned above, both LTE and NR networks (such as shown in FIGS. 1-2) can include a 3GPP-specified Public Warning System (PWS) with features of Earthquake and Tsunami Warning System (ETWS) and Commercial Mobile Alert System (CMAS). Network operators can broadcast ETWS and CMAS messages in each cell's system information.

Figure 5:
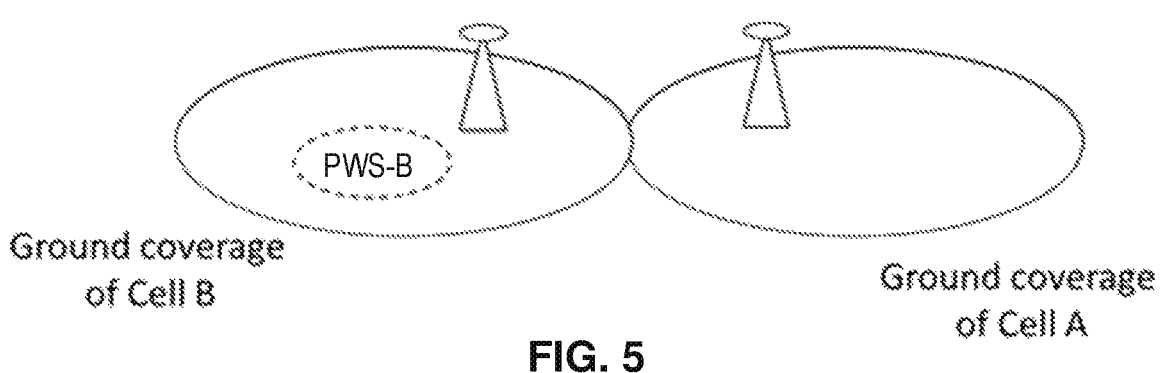
FIG. 5 illustrates broadcast of a public warning system (PWS) message having a particular area of relevance within a cell.

Some PWS messages may be applicable to an area is smaller than the cell coverage, e.g., a warning about an incident in a small part of a large cell. In these cases, the network can provide an area configuration (e.g., a set of coordinates, a shape, etc.) associated with a PWS message, which indicates that the PWS messages is applicable only to that area. FIG. 5 shows an exemplary arrangement in which cell B broadcasts a PWS with a relevant area corresponding to the dashed ellipse (labelled "PWS-B").

If an area configuration is provided with a PWS message, a UE will determine its position (e.g., using GPS) and based on that position determine whether it is within the configured area. If so, the UE may consider the PWS message applicable and display it to the user. If not, the UE may consider the PWS message not applicable and discard it without displaying to the user.

Figure 6:
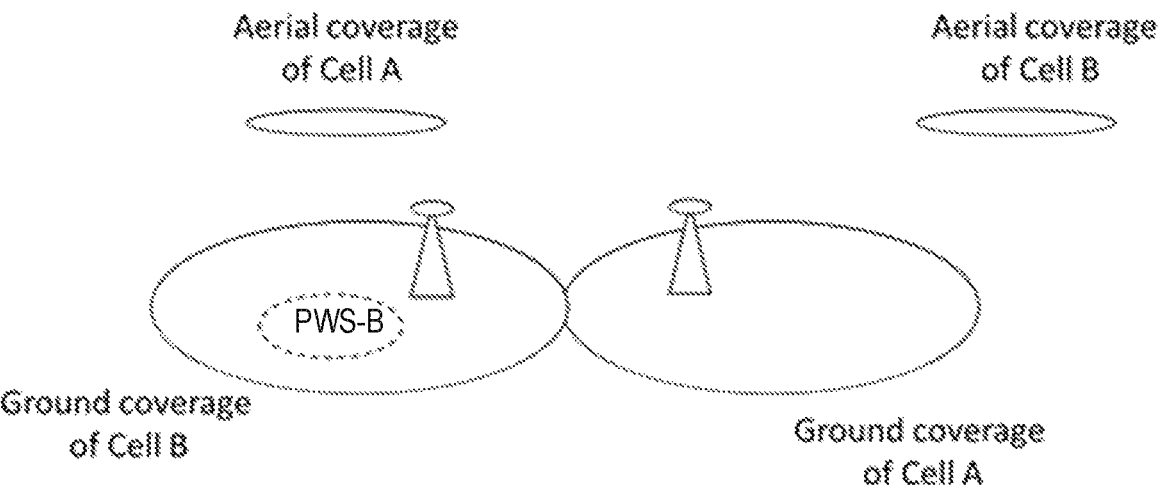
FIG. 6 illustrates aerial coverage and ground coverage of various cells relative to a relevant area for a PWS message broadcast in one of the cells.

However, an aerial UE flying above an incident may be served by a cell whose ground coverage area does not include area relevant to the incident. As such, the aerial UE will not receive a relevant PWS message broadcast in the cell by the cell's serving node. FIG. 6 illustrates this case in context of the arrangement shown in FIG. 4. Here the relevant area for an incident is in the ground coverage of cell B, and a PWS message about the incident is broadcast only in cell B, specifically in the relevant area labelled "PWS-B".

Even though the aerial UE is vertically above the relevant area for the incident, the aerial UE is within the aerial coverage of cell A. Thus, the aerial UE will not receive the PWS message about the incident broadcast in cell B—even though the incident may be directly below the aerial UE. Without this information, the aerial UE operator may not be able to take measures to avoid the incident. Without such avoidance, the aerial UE's presence proximate to the incident may exacerbate the incident, hinder response to the incident, and/or result in damage to the UE.

Accordingly, embodiments of the present disclosure provide techniques to facilitate aerial UEs to receive relevant PWS messages when they are close to an incident, even when they may be served by another cell than the cell whose ground coverage includes the area relevant to the incident. In some embodiments, the network can broadcast PWS message in cells whose ground coverage does not include the area relevant to the incident. In some embodiments, the network can indicate whether a PWS message is only applicable to UEs that meet one or more criteria, such as all aerial UEs, UEs with above-ground altitude greater than some threshold or within a range, etc. Based on these and other embodiments, aerial UEs will receive relevant PWS messages, thereby allowing aerial UEs (and/or their operators) to take incident-avoidance measures that they would not under conventional techniques in which they do not receive such messages.

In general, PWS messages broadcast by cells (e.g., cell B in FIG. 5) are provided by the core network (CN, e.g., EPC, 5GC) to the RAN nodes (e.g., base stations, eNBs, gNBs, ng-eNBs, etc.) that provide coverage of the relevant area(s) for an incident. In the example shown in FIG. 5, the PWS message may be provided to the RAN node that provides ground coverage in cell B that includes the relevant area, but not to the RAN node that provides ground coverage in cell A.

In some embodiments, the CN provides a PWS message (e.g., about an incident) to a set of RAN nodes even if the cells served by those RAN nodes do not provide ground coverage in the area relevant to the incident. The reason for doing this is that even if a cell does not provide ground coverage for the relevant area, the cell may provide aerial coverage for that area. In the context of FIG. 6, the CN provides the PWS message about the incident—with relevant area (dashed ellipse) in the ground coverage area of cell B—not only to cell B but also to cell A, which has aerial coverage above the relevant area in the ground coverage of cell B.

For example, the CN can provide the PWS message to RAN nodes serving cells with ground coverage that is known to be close to the incident, e.g., less than a threshold distance. The threshold distance may be chosen depending on parameters such as operating frequency band, maximum allowed altitude of aerial UEs, inter-site distance, etc. As a more specific example, the distance can be shorter at higher operating frequency since the chance of an aerial UE being served by a far-away may be reduced as frequency increases due to larger path loss. In another specific example, the distance can be larger when the maximum allowed altitude of aerial UEs is higher because it is more likely that the strongest signal arriving at the aerial UE is from a main lobe of a distant cell.

In some embodiments, the CN can provide a PWS message with an area configuration that is outside the ground coverage of a cell in which the message will be broadcast. For example, in the context of FIG. 6, the CN can provide cell A with a PWS message having an area configuration corresponding to a relevant area in the ground coverage of cell B (e.g., dashed ellipse) but outside of the ground coverage of cell A.

In some embodiments, the network can indicate whether a PWS message is applicable for aerial UEs. When the network indicates that a particular PWS message is applicable to aerial UEs, a particular UE reading that PWS message can determine it is applicable if the particular UE is capable of flying. In contrast, if the particular UE is capable of flying and the PWS message is indicated as not applicable to aerial UEs, the particular UE may consider the PWS message not applicable and disregard it.

In a variant, the particular UE reading that PWS message can determine it is applicable not only if the particular UE is capable of flying but when it is actually flying (i.e., actually operating as an aerial UE). In contrast, if the PWS message is indicated as not applicable to aerial UEs and the particular UE is either not capable of flying or capable but not actually flying, the particular UE may consider the PWS message not applicable and disregard it.

The indication of whether a PWS message is applicable to aerial UEs can be included in or associated with the PWS message. For example, a flag set to a first value to indicate that it is applicable to aerial UEs and to a second value to indicate that it is not applicable to aerial UEs. Alternatively, presence/absence logic may be applied; if an indication is present the UE considers the PWS message applicable to aerial UEs and if absent the UE considers the PWS message not applicable to aerial UEs.

In some embodiments, the network can provide an altitude threshold for applicability of a PWS message. For example, the PWS message can be applicable only to UEs above the threshold or only to UEs below the threshold. In some embodiments, the network can provide first and second altitude thresholds, such that the PWS message is applicable only to UEs at altitudes between the first and second thresholds. In some embodiments, the network can provide a plurality of altitude ranges in which the PWS message is applicable, with the implication that the PWS message is not applicable at altitudes outside of the plurality of ranges.

The UE can determine applicability of a particular PWS message based on its current altitude and the indicated altitude threshold(s) or altitude ranges. In some embodiments, when the UE is not able to determine its altitude, the UE may consider the message applicable by default. In such case, UEs on the ground will consider the PWS message applicable by default if they are unable to determine their actual altitudes relative to the indicated altitude threshold(s) or altitude ranges. In some embodiments, a UE can consider a PWS message without indicated altitude threshold(s) or altitude ranges to be applicable by default to all UEs, regardless of altitude.

In some embodiments, the PWS message can include a beam index that corresponds to an SSB beam coverage area in which the PWS message is applicable. Upon reading this PWS message, a particular UE determines the message's applicability based on which it is served by the SSB beam corresponding to the included beam index. In some cases, certain SSB beams can be uptilted and the resulting coverage area known to the transmitting RAN node, which can thus associate area of applicability of a PWS message with one or more beam indices.

Currently, the same SI is repeated in all SSB beams transmitted by a RAN node (e.g., in a particular cell). In some embodiments, a RAN node can transmit different SI in different ones of its SSB beams, such that a PWS message may only be transmitted in a subset of SSB beams that cover the area of applicability. In some embodiments, the RAN node can transmit SI specific to a particular aerial UE.

In some embodiments, the network can provide PWS messages to aerial UEs using unicast or dedicated signaling (e.g., RRC messages). For example, the network may determine the aerial UE's location and the relevant area for the incident and corresponding PWS message. If the aerial UE is in (or is approaching) the relevant area, the network may send the PWS message to the aerial UE using dedicated signaling. As another example, the network can send the PWS message to the aerial UE using dedicated signaling only when the aerial UE's altitude is above a threshold.

The network may know the location of an aerial UE based on reports by the aerial UE, based on network-based positioning of the aerial UE, and/or based on a known flight path of the aerial UE. The planned flight path can be obtained from UE reports or from an external entity such as the UTM. In some embodiments, the network can send a PWS message to aerial UEs whose planned flight paths cross the relevant area for the incident, without needing to know an actual current location of each UE.

In some embodiments, an aerial UE may be configured to ignore broadcast PWS messages based on an understanding (or specification) that the network will provide applicable PWS messages via dedicated signaling. In a variant, the UE may be configured to ignore broadcast PWS messages only when flying, only when flying above an altitude threshold, etc.

The embodiments described above can be further illustrated with reference to FIGS. 7-9, which show exemplary methods (e.g., procedures) for an aerial UE, a RAN node, and a CN node, respectively. In other words, various features of operations described below correspond to various embodiments described above. These exemplary methods can be used cooperatively to provide various exemplary benefits and/or advantages. Although FIGS. 7-9 show specific blocks in a particular order, the operations of the respective methods can be performed in different orders than shown and can be combined and/or divided into blocks having different functionality than shown. Optional blocks or operations are indicated by dashed lines.

In particular, FIG. 7 shows a flow diagram of an exemplary method (e.g., procedure) for a UE configured to receive PWS messages from a RAN comprising a plurality of cells, according to various embodiments of the present disclosure. The exemplary method can be performed by a UE (e.g., wireless device), such as an aerial UE described elsewhere herein.

The exemplary method can include operations of block 720, where the UE can receive, via a first cell (i.e., of the RAN) having a first ground coverage and a first aerial coverage, a PWS message having a relevant area within a second ground coverage of a second cell (i.e., of the RAN) but not within the first ground coverage (i.e., of the first cell). The exemplary method can also include operations of block 730, where the UE can determine whether the PWS message is applicable to the UE based on one or more of the following: a first indication of the relevant area, a second indication of relevant altitudes for the PWS message, a third indication of applicability of the PWS message to aerial UEs, and a type of signaling by which the PWS message is received.

In some embodiments, when the UE is an aerial UE, the exemplary method can also include the operations of block 710, where the UE can send, to a UTM system, flight path information including at least one location in the first aerial coverage.

In some embodiments, the third indication indicates that the PWS message is applicable to aerial UEs based on one of the following: being included in the PWS message, or having a particular value in the PWS message. In some of these embodiments, when the third indication indicates that the PWS message is applicable to aerial UEs, determining whether the PWS message is applicable to the UE (e.g., in block 730) can be further based on one of the following: the UE's capability as an aerial UE, or the UE's current operation as an aerial UE.

In some embodiments, the second indication comprises an altitude threshold or one or more altitude ranges. In some of these embodiments, when the second indication is included in the PWS message, determining whether the PWS message is applicable to the UE in block 730 can include the following operations, labelled with corresponding sub-block numbers:

(731) determining the UE's current altitude;

(732) determining that the PWS message is applicable to the UE when the current altitude meets a condition related to the second indication, the condition being one of the following: less than the altitude threshold, greater than the altitude threshold, within a particular one of the altitude ranges, or within any of the altitude ranges; and (733) determining that the PWS message is not applicable to the UE when the current altitude does not meet the condition related to the second indication.

In some of these embodiments, determining whether the PWS message is applicable to the UE in block 730 can also include the operations of sub-block 734, where the UE can determine that PWS message is applicable to the UE based on either of the following: the second indication is not included in the PWS message, or inability to determine the UE's current altitude (e.g., failure in sub-block 731).

In some embodiments, the first indication comprises one or more indices of respective one or more beams (e.g., SSB beams) having coverage areas that overlap with the relevant area. In some of these embodiments, determining whether the PWS message is applicable to the UE in block 730 can include the following UE operations, labelled with corresponding sub-block numbers:

(735) determining that the PWS message is applicable to the UE when the PWS message is received via a beam having one of the indices comprising the first indication; and (736) determining that the PWS message is not applicable to the UE when the PWS message is received via a beam having an index other than the indices comprising the first indication.

In some embodiments, determining whether the PWS message is applicable to the UE in block 730 can include the operations of sub-blocks 737-738, where the UE can determine that the PWS message is applicable to the UE based on receiving the PWS message via dedicated signaling and determine that the PWS message is not applicable to the UE based on receiving the PWS message via broadcast signaling. In some of these embodiments, determining that the PWS message received via broadcast signaling is not applicable to the UE (e.g., in sub-block 738) can be further based on one of the following: the UE's current operation as an aerial UE, or the UE's current altitude being above a threshold.

In addition, FIG. 8 shows a flow diagram of an exemplary method (e.g., procedure) for a RAN node to provide PWS messages to UEs, according to various embodiments of the present disclosure. The exemplary method can be performed by a RAN node (e.g., base station, eNB, gNB, ng-eNB, en-gNB, etc., or components thereof) such as described elsewhere herein.

The exemplary method can include operations of block 830, where the RAN node can transmit a PWS message via a first cell of the RAN. The first cell has a first ground coverage and a first aerial coverage. The PWS message has a relevant area within a second ground coverage of a second cell of the RAN, but not within the first ground coverage (i.e., of the first cell). The PWS message can indicate applicability to receiving UEs based on one or more of the following: a first indication of the relevant area, a second indication of relevant altitudes for the PWS message, a third indication of applicability of the PWS message to aerial UEs, and a type of signaling by which the RAN node transmits the PWS message.

In some embodiments, the exemplary method can also include operations of block 820, where the RAN node can receive the PWS message from a node or function of a core network (CN) coupled to the RAN. The received PWS message can then be transmitted in block 830.

In some embodiments, the third indication indicates that the PWS message is applicable to aerial UEs based on one of the following being included in the PWS message, or having a particular value in the PWS message. Additionally, the third indication further indicates whether the PWS message is applicable to each particular UE that receives the PWS message, based on one of the following: the particular UE's capability as an aerial UE, or the particular UE's current operation as an aerial UE.

In some embodiments, the second indication comprises an altitude threshold or one or more altitude ranges. Additionally, the second indication further indicates that the PWS message is applicable to each particular UE that receives the PWS message based on the particular UE's current altitude meeting a condition related to the second indication, wherein the condition is one of the following: less than the altitude threshold, greater than the altitude threshold, within a particular one of the altitude ranges, or within any of the altitude ranges. In some of these embodiments, exclusion of the second indication from the PWS message indicates that the PWS message is applicable to all UEs that receive the PWS message.

In some embodiments, when the first indication is included in the PWS message, the first indication comprises one or more indices of respective one or more beams having coverage areas that overlap with the relevant area. In such case, the first indication indicates that the PWS message is applicable to each particular UE based on the particular UE receiving the PWS message via a beam having one of the indices.

In some embodiments, the PWS message is transmitted via one of the following:

broadcast signaling, which indicates that the PWS is applicable to non-aerial UEs but not applicable to aerial UEs; or unicast signaling to a particular UE for which the PWS message is applicable.

In some of these embodiments, when the PWS message is transmitted via broadcast signaling, applicability of the PWS message to a particular receiving UE is further based on one of the following: whether or not the particular receiving UE's is currently operating as an aerial UE, or the particular receiving UE's current altitude relative to a threshold.

In some embodiments, the exemplary method can also include the operations of blocks 810, where the RAN node can receive flight path information for an aerial UE from a UTM system. The flight path information includes at least one location in the first aerial coverage and a corresponding time. In such embodiments, the PWS message is transmitted to the aerial UE (e.g., in block 830) via unicast signaling at approximately the corresponding time.

In addition, FIG. 9 shows a flow diagram of an exemplary method (e.g., procedure) for a CN node to provide PWS messages to UEs via a RAN, according to various embodiments of the present disclosure. The exemplary method can be performed by a CN node or function (e.g., MME, SGW, AMF, SMF, UPF, etc., or components thereof) such as described elsewhere herein.

The exemplary method can include operations of block 910, where the CN node can determine a relevant area for an incident, with the relevant area being within a second ground coverage of a second cell of the RAN. The exemplary method can also include operations of block 920, where the CN node can determine one or more additional cells of the RAN having respective ground coverage areas proximate to the relevant area. The additional cells include a first cell having a first ground coverage area and a first aerial coverage area. The exemplary method can also include the operations of block 930, where the CN node can send a PWS message, pertaining to the incident, to one or more RAN nodes for transmission to UEs via the second cell and the one or more additional cells.

In some embodiments, the PWS message indicates applicability to receiving UEs based on one or more of the following: a first indication of the relevant area, a second indication of relevant altitudes for the PWS message, a third indication of applicability of the PWS message to aerial UEs, and a type of signaling by which the respective RAN nodes transmit the PWS message.

In some of these embodiments, the third indication indicates that the PWS message is applicable to aerial UEs based on one of the following: being included in the PWS message, or having a particular value in the PWS message. Additionally, the third indication indicates whether the PWS message is applicable to each particular UE that receives the PWS message, based on one of the following: the particular UE's capability as an aerial UE, or the particular UE's current operation as an aerial UE.

In some embodiments, when the second indication is included in the PWS message, the second indication comprises an altitude threshold or one or more altitude ranges. Additionally, the second indication further indicates that the PWS message is applicable to each particular UE that receives the PWS message based on the particular UE's current altitude meeting a condition related to the second indication, wherein the condition is one of the following: less than the altitude threshold, greater than the altitude threshold, within a particular one of the altitude ranges, or within any of the altitude ranges. In some of these embodiments, exclusion of the second indication from the PWS message can indicate that the PWS message is applicable to all receiving UEs.

In some embodiments, when the first indication is included in the PWS message, the first indication comprises one or more indices of respective one or more beams (e.g., SSB beams) having coverage areas that overlap with the relevant area Additionally, the first indication indicates that the PWS message is applicable to each particular UE based on the particular UE receiving the PWS message via a beam having one of the indices.

In some embodiments, the type of signaling that can be used by the RAN nodes to transmit the PWS message is one of the following:

broadcast signaling, which indicates that the PWS is applicable to non-aerial UEs but not applicable to aerial UEs; or unicast signaling to a particular UE for which the PWS message is applicable.

In some of these embodiments, when the PWS message is transmitted via broadcast signaling, applicability of the PWS message to a particular receiving UE is further based on one of the following: whether the particular UE is currently operating as an aerial UE, or the particular UE's current altitude relative to a threshold.

In some of these embodiments, determining the one or more additional cells having respective proximate ground coverage areas (e.g., in block 920) is based on a threshold distance from the relevant area. In such embodiments, the threshold distance is based on one or more of the following: respective operating frequencies of the second cell and the additional cells, size or spacing of the second cell and the additional cells, and maximum allowed altitude of aerial UEs. Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 10:
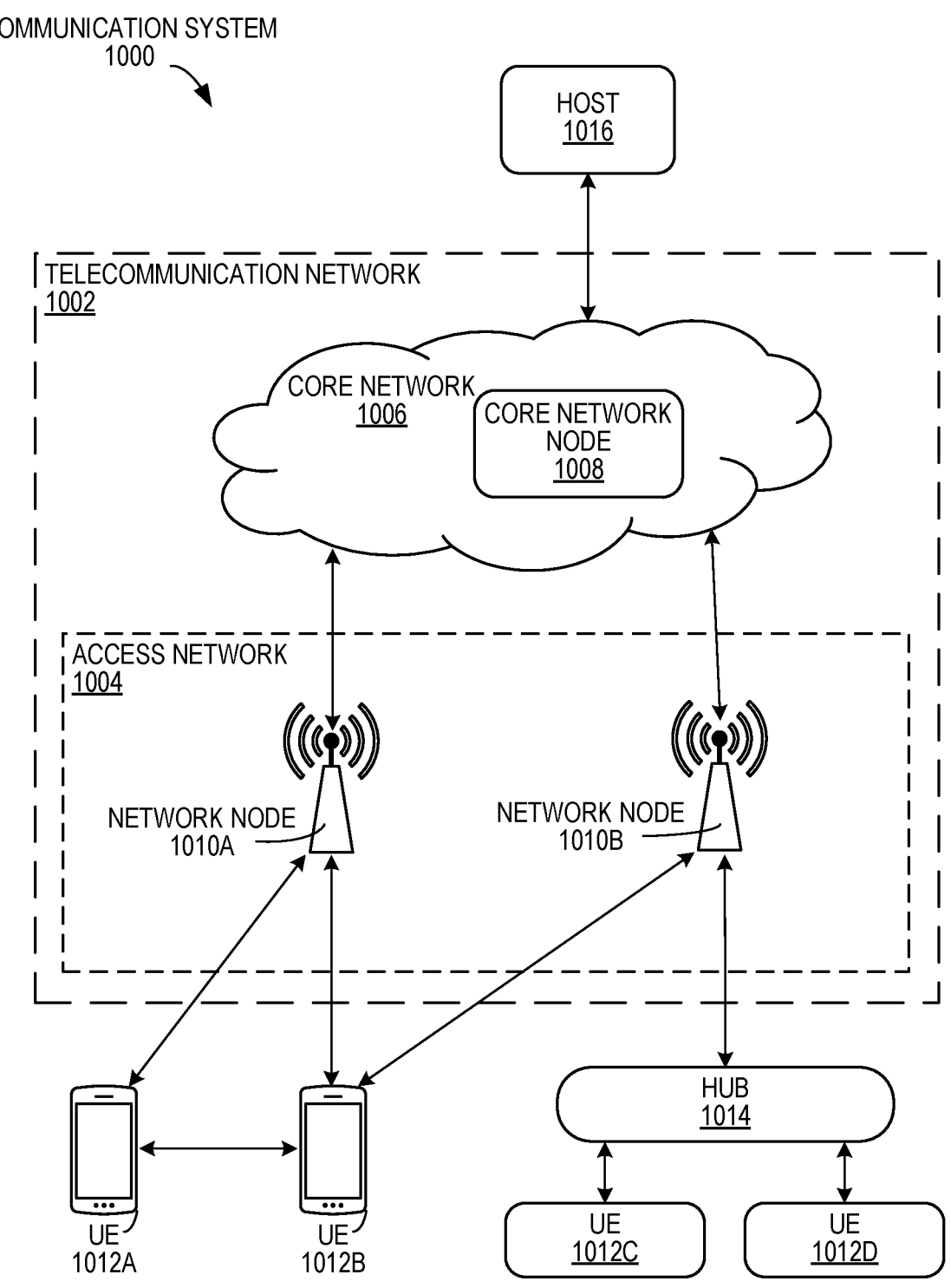
FIG. 10 shows a communication system according to various embodiments of the present disclosure.

FIG. 10 shows an example of a communication system 1000 in accordance with some embodiments. In this example, the communication system 1000 includes a telecommunication network 1002 that includes an access network 1004 (e.g., RAN) and a core network 1006, which includes one or more core network nodes 1008. The access network 1004 includes one or more access network nodes, such as network nodes 1010a and 1010b (one or more of which may be generally referred to as network nodes 1010), or any other similar 3GPP access node or non-3GPP access point. The network nodes 1010 facilitate direct or indirect connection of UEs, such as by connecting UEs 1012a, 1012b, 1012c, and 1012d (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server. For example, host 1016 may be an Unmanned Aircraft Systems Traffic Management (UTM) system such as described elsewhere herein.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012c and/or 1012d) and network nodes (e.g., network node 1010b). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010b. The hub 1014 may also allow for a different communication scheme and/or schedule between the hub 1014 and UEs (e.g., UE 1012c and/or 1012d), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010b. In other embodiments, the hub 1014 may be a non-dedicated hub—that is, a device which is capable of operating to route communications between the UEs and network node 1010b, but which is additionally capable of operating as a communication start and/or end point for certain data channels.

Figure 11:
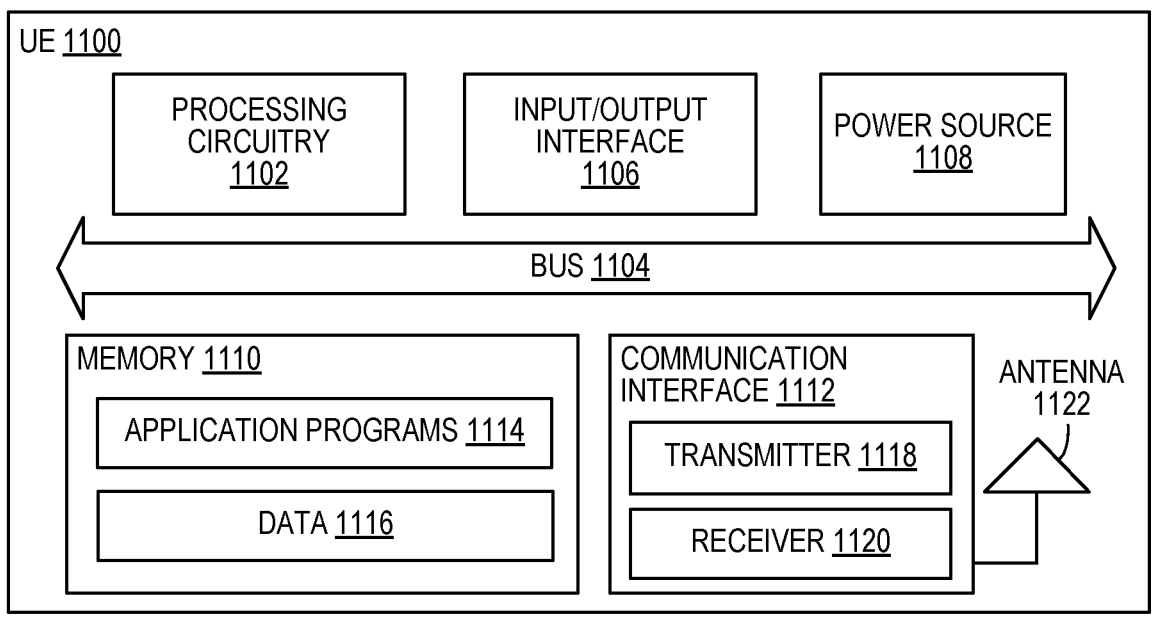
FIG. 11 shows a UE according to various embodiments of the present disclosure.

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an aerial UE (e.g., UAV, drone, etc.), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
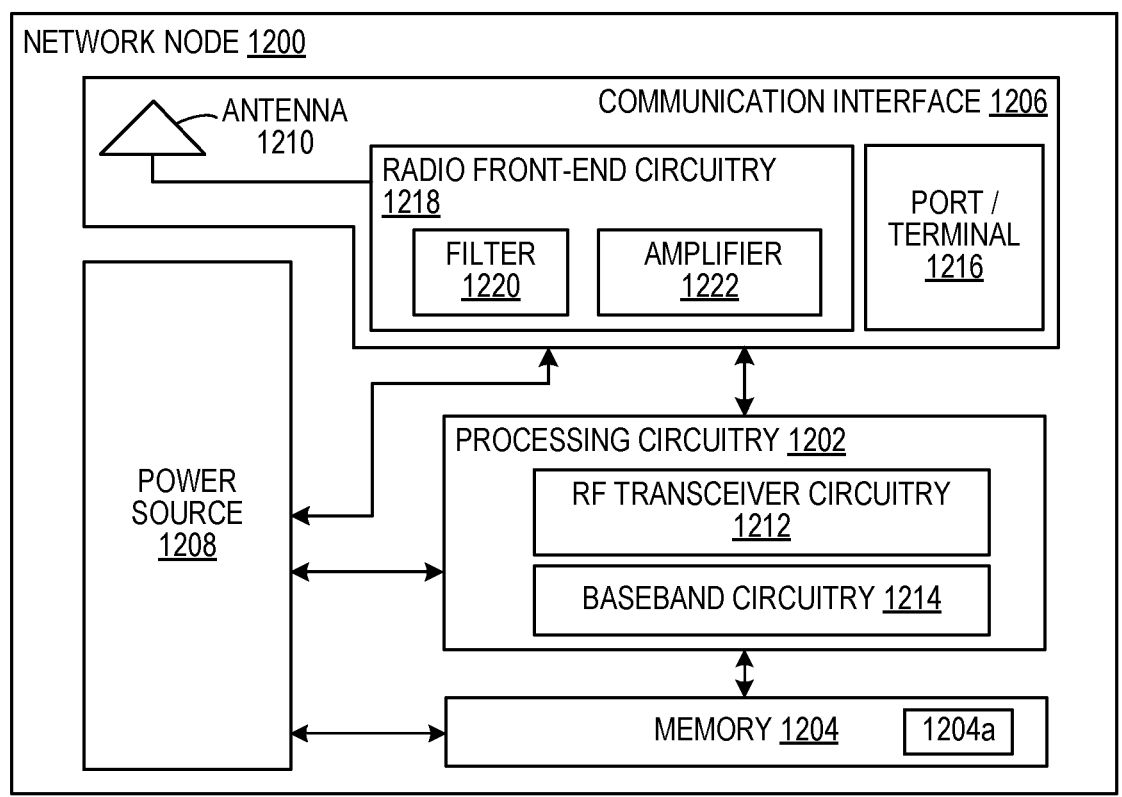
FIG. 12 shows a network node according to various embodiments of the present disclosure.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR B Ss, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions (collectively denoted computer program product 1204a) capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
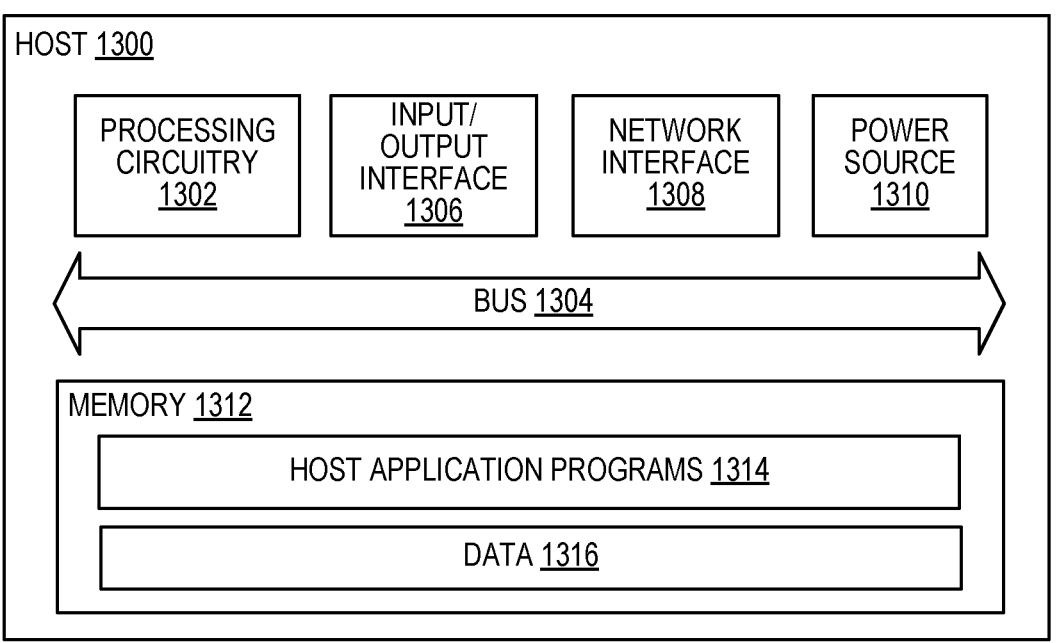
FIG. 13 shows host computing system according to various embodiments of the present disclosure.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs. For example, host 1300 may be a UTM system such as described elsewhere herein.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
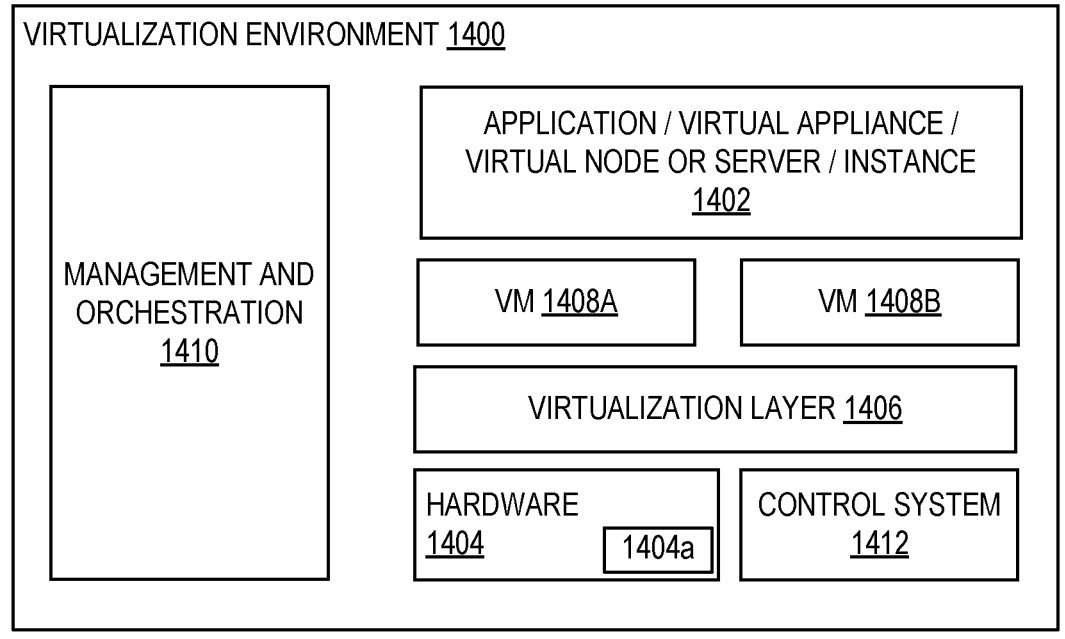
FIG. 14 is a block diagram of a virtualization environment in which functions corresponding to some embodiments of the present disclosure may be virtualized.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment 1400 to implement some of the features, functions, and/or benefits of some of the embodiments disclosed herein.

Hardware 1404 includes processing circuitry, memory that stores software and/or instructions (collectively denoted computer program product 1404$a$) executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408$a$ and 1408$b$ (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g., such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

Figure 15:
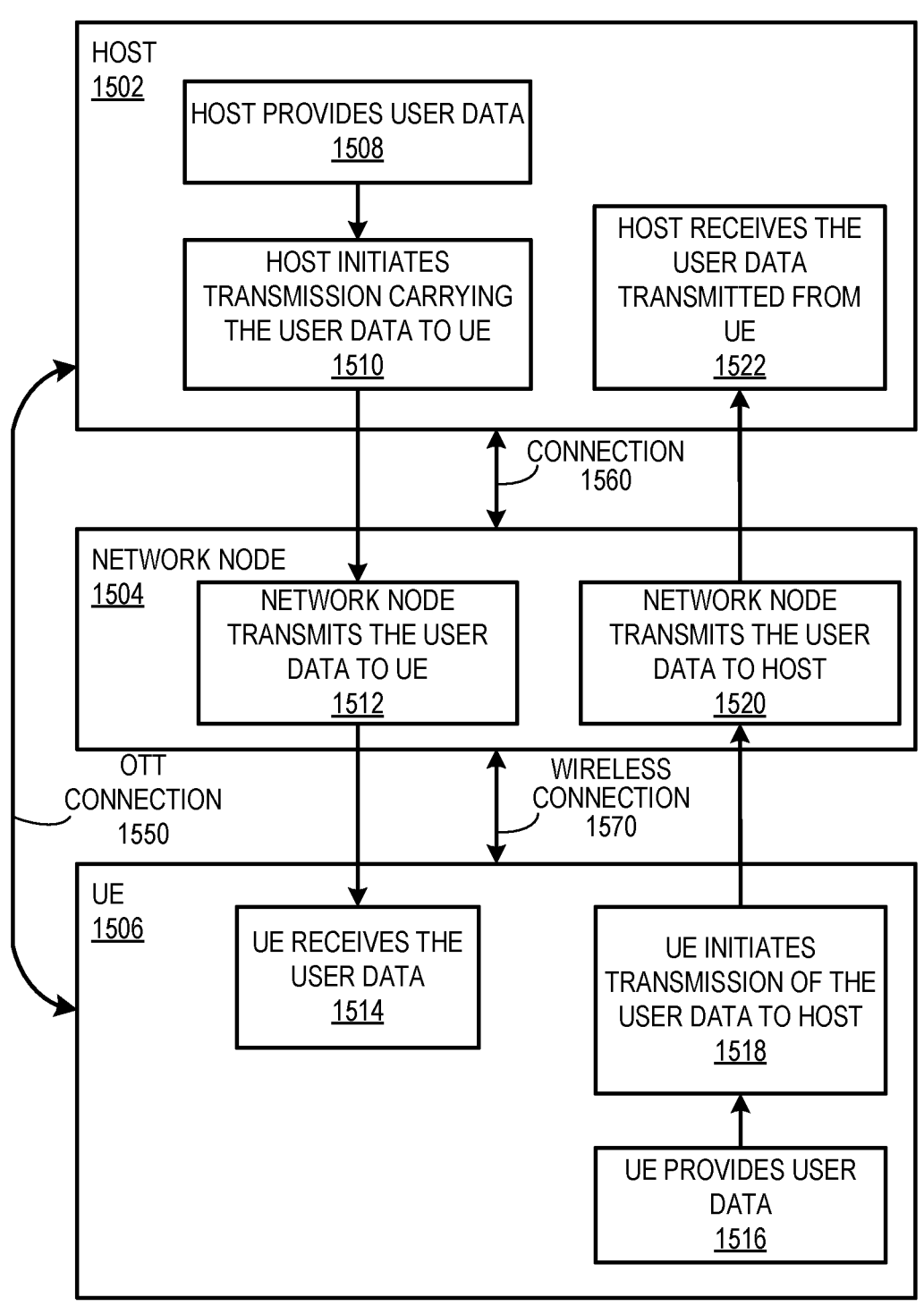
FIG. 15 illustrates communication between a host computing system, a network node, and a UE via multiple connections, at least one of which is wireless, according to various embodiments of the present disclosure.

FIG. 15 shows a communication diagram of a host 1502 (e.g., UTM system) communicating via a network node 1504 with a UE 1506 (e.g., an aerial UE) over a partially wireless connection in accordance with some embodiments. Example implementations, in accordance with various embodiments, of the UE (such as a UE 1012*a* of FIG. 10 and/or UE 1100 of FIG. 11), network node (such as network node 1010*a* of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment. More precisely, embodiments can facilitate aerial UEs to receive relevant public warning system (PWS) messages when they are close to an incident, even when they are served by a cell other than the cell whose ground coverage includes the relevant area for the incident. Accordingly, aerial UEs that receive these relevant PWS messages can take incident-avoidance measures that they would not take under conventional operation in which they do not receive such messages. Without such avoidance, the aerial UE's presence proximate to the incident may exacerbate the incident, hinder response to the incident, and/or result in damage to the UE. At a high level, embodiments improve the performance of PWS and facilitate safe operation of aerial UEs in a wireless network, which creates more value for end users and providers of OTT services to all UEs that rely on the wireless network.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above, or supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In addition, certain terms used in the present disclosure, including the specification, drawings and embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method for a user equipment (UE) configured to receive public warning system (PWS) messages from a radio access network (RAN), the method comprising:

receiving, via a first cell having a first ground coverage and a first aerial coverage, a PWS message having a relevant area within a second ground coverage of a second cell but not within the first ground coverage; and determining whether the PWS message is applicable to the UE based on one or more of the following: a first indication of the relevant area, a second indication of relevant altitudes for the PWS message, a third indication of applicability of the PWS message to aerial UEs, and a type of signaling by which the PWS message is received.

A2. The method of embodiment A1, wherein the third indication indicates that the PWS message is applicable to aerial UEs based on one of the following: presence in the PWS message, or having a particular value.

A3. The method of embodiment A2, wherein determining whether the PWS message is applicable to the UE comprises:

when the third indication indicates that the PWS message is applicable to aerial UEs, determining that the PWS message is applicable to the UE based on one of the following: the UE's capability as an aerial UE, or the UE's current operation as an aerial UE; and otherwise determining that the PWS message is not applicable to the UE.

A4. The method of embodiment A1, wherein the second indication comprises one of the following: an altitude threshold, or one or more altitude ranges.

A5. The method of embodiment A4, wherein determining whether the PWS message is applicable to the UE comprises:

determining the UE's current altitude;

determining that the PWS message is applicable to the UE based the current altitude meeting one of the following criteria: being less than the altitude threshold, being greater than the altitude threshold, or being within one of the one or more altitude ranges; and otherwise determining that the PWS message is not applicable to the UE.

A6. The method of embodiment A5, wherein determining whether the PWS message is applicable to the UE further comprises determining that PWS message is applicable to the UE based on one of the following: the second indication not being included in the PWS message, or inability to determine the UE's current altitude.

A7. The method of embodiment A1, wherein the first indication comprises one or more indices of respective one or more beams having coverage areas that overlap with the relevant area.

A8. The method of embodiment A7, wherein determining whether the PWS message is applicable to the UE comprises:

determining that the PWS message is applicable to the UE based on receiving the PWS message via a beam having one of the indices; and otherwise determining that the PWS message is not applicable to the UE.

A9. The method of embodiment A1, wherein determining whether the PWS message is applicable to the UE comprises:

determining that the PWS message is applicable to the UE based on receiving the PWS message via dedicated signaling; and determining that the PWS message is not applicable to the UE based on receiving the PWS message via broadcast signaling.

A10. The method of embodiment A9, wherein determining that the PWS message received via broadcast signaling is not applicable to the UE is further based on one of the following: the UE's current operation as an aerial UE, or the UE's current altitude being above a threshold.

A11. The method of any of embodiments A1-A10, further comprising sending, to an Unmanned Aircraft Systems Traffic Management (UTM) system, flight path information including at least one location in the first aerial coverage.

B1. A method for a radio access network (RAN) node to provide public warning system (PWS) messages to user equipment (UE), the method comprising:

transmitting, via a first cell having a first ground coverage and a first aerial coverage, a PWS message having a relevant area within a second ground coverage of a second cell but not within the first ground coverage, wherein the PWS message indicates applicability to receiving UEs based on one or more of the following:

a first indication of the relevant area, a second indication of relevant altitudes for the PWS message, a third indication of applicability of the PWS message to aerial UEs, and a type of signaling by which the RAN node transmits the PWS message.

B2. The method of embodiment B1, wherein:

the third indication indicates that the PWS message is applicable to aerial UEs based on one of the following: presence in the PWS message, or having a particular value; and the third indication indicates that the PWS message is applicable to a particular receiving UE further based on one of the following: the particular receiving UE's capability as an aerial UE, or the particular receiving UE's current operation as an aerial UE.

B3. The method of embodiment B1, wherein:

the second indication comprises one of the following: an altitude threshold, or one or more altitude ranges; and the second indication indicates that the PWS message is applicable to a particular receiving UE based on the particular receiving UE's current altitude being one of the following: less than the altitude threshold, greater than the altitude threshold, or within one of the one or more altitude ranges.

B4. The method of embodiment B4, wherein exclusion of the second indication from the PWS message indicates that the PWS message is applicable to all receiving UEs.

B5. The method of embodiment B1, wherein:

the first indication comprises one or more indices of respective one or more beams having coverage areas that overlap with the relevant area; and the second indication indicates that the PWS message is applicable to a particular receiving UE based on the particular UE receiving the PWS message via a beam having one of the indices.

B6. The method of embodiment B1, wherein the PWS message is transmitted via one of the following:

broadcast signaling, which indicates that the PWS is applicable to non-aerial UEs but not applicable to aerial UEs; or unicast signaling to a particular UE for which the PWS message is applicable.

B7. The method of embodiment B6, wherein when the PWS message is transmitted via broadcast signaling, applicability of the PWS message to a particular receiving UE is further based on one of the following: whether or not the particular receiving UE's is currently operating as an aerial UE, or the particular receiving UE's current altitude relative to a threshold.

B8. The method of any of embodiments B1-B7, wherein:

the method further comprises receiving, from an Unmanned Aircraft Systems Traffic Management (UTM) system, flight path information for a particular UE, wherein the flight path information includes at least one location in the first aerial coverage and a corresponding time; and the PWS message is transmitted to the particular UE via unicast signaling at approximately the corresponding time.

B9. The method of any of embodiments B1-B8, further comprising receiving the PWS message from a node or function of a core network (CN) coupled to the RAN.

C1. A method for a core network (CN) node to provide public warning system (PWS) messages to user equipment (UE) via a radio access network (RAN), the method comprising:

determining a relevant area for an incident, the relevant area being within a second ground coverage of a second cell;

determining one or more additional cells having respective ground coverage areas proximate to the relevant area, wherein the additional cells include a first cell having a first ground coverage area and a first aerial coverage area; and sending the PWS message to one or more RAN nodes for transmission to UEs in the second cell and the one or more additional cells, wherein the PWS message indicates applicability to receiving UEs based on one or more of the following:

a first indication of the relevant area, a second indication of relevant altitudes for the PWS message, and a third indication of applicability of the PWS message to aerial UEs.

type of signaling by which the respective RAN nodes transmit the PWS message.

C2. The method of embodiment C1, wherein:

the third indication indicates that the PWS message is applicable to aerial UEs based on one of the following: presence in the PWS message, or having a particular value; and the third indication indicates that the PWS message is applicable to a particular receiving UE further based on one of the following: the particular receiving UE's capability as an aerial UE, or the particular receiving UE's current operation as an aerial UE.

C3. The method of embodiment C1, wherein:

the second indication comprises one of the following: an altitude threshold, or one or more altitude ranges; and the second indication indicates that the PWS message is applicable to a particular receiving UE based on the particular receiving UE's current altitude being one of the following: less than the altitude threshold, greater than the altitude threshold, or within one of the one or more altitude ranges.

C4. The method of embodiment C3, wherein exclusion of the second indication from the PWS message indicates that the PWS message is applicable to all receiving UEs.

C5. The method of embodiment C1, wherein:

the first indication comprises one or more indices of respective one or more beams having coverage areas that overlap with the relevant area; and the first indication indicates that the PWS message is applicable to a particular receiving UE based on the particular UE receiving the PWS message via a beam having one of the indices.

C6. The method of embodiment C1, wherein the type of signaling is one of the following:

broadcast signaling, which indicates that the PWS is applicable to non-aerial UEs but not applicable to aerial UEs; or unicast signaling to a particular UE for which the PWS message is applicable.

C7. The method of embodiment C6, wherein when the PWS message is transmitted via broadcast signaling, applicability of the PWS message to a particular receiving UE is further based on one of the following: whether or not the particular receiving UE's is currently operating as an aerial UE, or the particular receiving UE's current altitude relative to a threshold.

C8. The method of any of embodiments C1-C7, wherein:

determining the one or more additional cells having respective proximate ground coverage areas is based on a threshold distance from the relevant area; and the threshold distance is based on one or more of the following: respective operating frequencies of the second cell and the additional cells, size or spacing of the second cell and the additional cells, and maximum allowed altitude of aerial UEs.

D1. A user equipment (UE) configured to receive public warning system (PWS) messages from a radio access network (RAN), the UE comprising:

communication interface circuitry configured to communicate with a RAN node; and processing circuitry operatively coupled to the communication interface circuitry, whereby the processing circuitry and the communication interface circuitry are configured to perform operations corresponding to the methods of any of embodiments A1-A11.

D2. A user equipment (UE) configured to receive public warning system (PWS) messages from a radio access network (RAN), the UE being further configured to perform operations corresponding to the methods of any of embodiments A1-A11.

D3. A non-transitory, computer-readable medium storing computer-executable instructions that, when executed by processing circuitry of a user equipment (UE) configured to receive public warning system (PWS) messages from a radio access network (RAN), configure the UE to perform operations corresponding to the methods of any of embodiments A1-A11.

D4. A computer program product comprising computer-executable instructions that, when executed by processing circuitry of a user equipment (UE) configured to receive public warning system (PWS) messages from a radio access network (RAN), configure the UE to perform operations corresponding to the methods of any of embodiments A1-A11.

E1. A radio access network (RAN) node configured to provide public warning system (PWS) messages to user equipment (UE), the RAN node comprising:
communication interface circuitry configured to communicate with one or more UEs and with a core network (CN); and
processing circuitry operatively coupled to the communication interface circuitry, whereby the processing circuitry and the communication interface circuitry are configured to perform operations corresponding to the methods of any of embodiments B1-B9.

E2. A radio access network (RAN) node configured to provide public warning system (PWS) messages to user equipment (UE), the RAN node being further configured to perform operations corresponding to the methods of any of embodiments B1-B9.

E3. A non-transitory, computer-readable medium storing computer-executable instructions that, when executed by processing circuitry of a radio access network (RAN) node configured to provide public warning system (PWS) messages to user equipment (UE), configure the RAN node to perform operations corresponding to the methods of any of embodiments B1-B9.

E4. A computer program product comprising computer-executable instructions that, when executed by processing circuitry of a radio access network (RAN) node configured to provide public warning system (PWS) messages to user equipment (UE), configure the RAN node to perform operations corresponding to the methods of any of embodiments B1-B9.

F1. A core network (CN) node to provide public warning system (PWS) messages to user equipment (UE) via a radio access network (RAN), the CN node comprising:
communication interface circuitry configured to communicate with one or more UEs and via the RAN; and
processing circuitry operatively coupled to the communication interface circuitry, whereby the processing circuitry and the communication interface circuitry are configured to perform operations corresponding to the methods of any of embodiments C1-C8.

F2. A core network (CN) node to provide public warning system (PWS) messages to user equipment (UE) via a radio access network (RAN), the CN node being further configured to perform operations corresponding to the methods of any of embodiments C1-C8.

F3. A non-transitory, computer-readable medium storing computer-executable instructions that, when executed by processing circuitry of a core network (CN) node to provide public warning system (PWS) messages to user equipment (UE) via a radio access network (RAN), configure the CN node to perform operations corresponding to the methods of any of embodiments C1-C8.

F4. A computer program product comprising computer-executable instructions that, when executed by processing circuitry of a core network (CN) node to provide public warning system (PWS) messages to user equipment (UE) via a radio access network (RAN), configure the CN node to perform operations corresponding to the methods of any of embodiments C1-C8.

The invention claimed is:

1. A method for a user equipment (UE) configured to receive public warning system (PWS) messages from a radio access network (RAN) comprising a plurality of cells, the method comprising:
receiving, via a first cell having a first ground coverage and a first aerial coverage, a PWS message having a relevant area within a second ground coverage of a second cell but not within the first ground coverage; and
determining whether the PWS message is applicable to the UE based on a first indication of the relevant area and on one or more of the following:
a second indication of relevant altitudes for the PWS message, and
a third indication of applicability of the PWS message to aerial UEs,
wherein the first indication comprises one or more indices of respective one or more beams having coverage areas that overlap with the relevant area, and determining whether the PWS message is applicable to the UE comprises:
determining that the PWS message is applicable to the UE when the PWS message is received via a beam having one of the indices comprising the first indication; and
determining that the PWS message is not applicable to the UE when the PWS message is received via a beam having an index other than the indices comprising the first indication.

2. The method of claim 1, wherein:
the third indication indicates that the PWS message is applicable to aerial UEs based on one of the following: being included in the PWS message, or having a particular value in the PWS message; and
when the third indication indicates that the PWS message is applicable to aerial UEs, determining whether the PWS message is applicable to the UE is further based on one of the following: the UE's capability as an aerial UE, or the UE's current operation as an aerial UE.

3. The method of claim 1, wherein:
the second indication comprises one of the following: an altitude threshold, or one or more altitude ranges; and when the second indication is included in the PWS message, determining whether the PWS message is applicable to the UE comprises:

determining the UE's current altitude;

determining that the PWS message is applicable to the UE when the current altitude meets a condition related to the second indication; and determining that the PWS message is not applicable to the UE when the current altitude does not meet the condition related to the second indication, wherein the condition related to the second indication is one of the following: less than the altitude threshold, greater than the altitude threshold, within a particular one of the altitude ranges, or within any of the altitude ranges.

4. The method of claim 3, wherein determining whether the PWS message is applicable to the UE further comprises determining that PWS message is applicable to the UE based on either of the following: the second indication is not included in the PWS message, or inability to determine the UE's current altitude.

5. A method for a radio access network (RAN) node to provide public warning system (PWS) messages to user equipment (UEs), the method comprising:

transmitting a PWS message via a first cell of the RAN, wherein:

the first cell has a first ground coverage and a first aerial coverage;

the PWS message has a relevant area within a second ground coverage of a second cell of the RAN, but not within the first ground coverage;

the PWS message indicates applicability to receiving UEs based on a first indication of the relevant area and on one or more of the following:

a second indication of relevant altitudes for the PWS message, and a third indication of applicability of the PWS message to aerial UEs;

the first indication comprises one or more indices of respective one or more beams having coverage areas that overlap with the relevant area; and the first indication indicates that the PWS message is applicable to each particular UE based on the particular UE receiving the PWS message via a beam having one of the indices.

6. The method of claim 5, wherein:

the third indication indicates that the PWS message is applicable to aerial UEs based on one of the following: being included in the PWS message, or having a particular value in the PWS message; and the third indication further indicates whether the PWS message is applicable to each particular UE that receives the PWS message, based on one of the following: the particular UE's capability as an aerial UE, or the particular UE's current operation as an aerial UE.

7. The method of claim 5, wherein:

the second indication comprises one of the following: an altitude threshold, or one or more altitude ranges; and when the second indication is included in the PWS message, the second indication further indicates that the PWS message is applicable to each particular UE that receives the PWS message based on the particular UE's current altitude meeting a condition related to the second indication, wherein the condition is one of the following: less than the altitude threshold, greater than the altitude threshold, within a particular one of the altitude ranges, or within any of the altitude ranges.

8. The method of claim 7, wherein exclusion of the second indication from the PWS message indicates that the PWS message is applicable to all UEs that receive the PWS message.

9. The method of claim 5, wherein:

the method further comprises receiving flight path information for an aerial UE from an Unmanned Aircraft Systems Traffic Management (UTM) system;

the flight path information includes at least one location in the first aerial coverage and a corresponding time; and the PWS message is transmitted to the aerial UE via unicast signaling at approximately the corresponding time.

10. The method of claim 5, further comprising receiving the PWS message from a node or function of a core network (CN) coupled to the RAN.

11. A method for a core network (CN) node to provide public warning system (PWS) messages to user equipment (UEs) via a radio access network (RAN), the method comprising:

determining a relevant area for an incident, wherein the relevant area is within a second ground coverage of a second cell of the RAN;

determining one or more additional cells of the RAN that have respective ground coverage areas proximate to the relevant area, wherein the additional cells include a first cell that has a first ground coverage area and a first aerial coverage area; and sending a PWS message, pertaining to the incident, to one or more RAN nodes for transmission to UEs via the second cell and the one or more additional cells, wherein:

the PWS message indicates applicability to receiving UEs based on a first indication of the relevant area and on one or more of the following: a second indication of relevant altitudes for the PWS message, and a third indication of applicability of the PWS message to aerial UEs;

the first indication comprises one or more indices of respective one or more beams having coverage areas that overlap with the relevant area; and the first indication indicates that the PWS message is applicable to each particular UE based on the particular UE receiving the PWS message via a beam having one of the indices.

12. The method of claim 11, wherein:

the third indication indicates that the PWS message is applicable to aerial UEs based on one of the following: being included in the PWS message, or having a particular value in the PWS message; and the third indication further indicates whether the PWS message is applicable to each particular UE that receives the PWS message, based on one of the following: the particular UE's capability as an aerial UE, or the particular UE's current operation as an aerial UE.

13. The method of claim 11, wherein:

the second indication comprises one of the following: an altitude threshold, or one or more altitude ranges;

when the second indication is included in the PWS message, the second indication further indicates that the PWS message is applicable to each particular UE that receives the PWS message based on the particular UE's current altitude meeting a condition related to the second indication; and the condition related to the second indication is one of the following: less than the altitude threshold, greater than the altitude threshold, within a particular one of the altitude ranges, or within any of the altitude ranges.

14. The method of claim 13, wherein exclusion of the second indication from the PWS message indicates that the PWS message is applicable to all UEs that receive the PWS message.

15. A user equipment (UE) comprising communication interface and processing circuitry that are operatively coupled and are configured to perform the method of claim 1.

16. A radio access network (RAN) node comprising communication interface circuitry and processing circuitry that are operatively coupled and are configured to perform the method of claim 5.

17. A core network (CN) node comprising communication interface circuitry and processing circuitry that are operatively coupled and are configured to perform the method of claim 11.

* * * * *